United States Patent [19]
Kim

[11] Patent Number: 5,717,521
[45] Date of Patent: Feb. 10, 1998

[54] SUPER WIDE-ANGLE VARIABLE MAGNIFICATION VIEW FINDER

[75] Inventor: Moon-Hyeon Kim, Kyeongsangnam-do, Rep. of Korea

[73] Assignee: Samsung Aerospace Industries, Ltd., Kyungsangnam-do, Rep. of Korea

[21] Appl. No.: 747,486

[22] Filed: Nov. 12, 1996

[30] Foreign Application Priority Data

Dec. 20, 1995 [KR] Rep. of Korea ............ 95-52836

[51] Int. Cl.⁶ ............ G02B 21/00; G02B 23/00; G02B 15/14
[52] U.S. Cl. ............ 359/380; 359/432; 359/676; 359/708; 359/643; 359/656
[58] Field of Search ............ 359/380, 418, 359/422, 432, 679, 676, 708, 713, 714, 737, 643, 656

[56] References Cited

U.S. PATENT DOCUMENTS

| | | | |
|---|---|---|---|
| 4,842,395 | 6/1989 | Sato et al. | 359/380 |
| 5,086,353 | 2/1992 | Mukai et al. | 359/432 |
| 5,555,431 | 9/1996 | Kim | 359/676 |

FOREIGN PATENT DOCUMENTS 6-102454  4/1994  Japan.

*Primary Examiner*—David C. Nelms
*Assistant Examiner*—Evelyn A. Lester
*Attorney, Agent, or Firm*—Finnegan, Henderson, Farabow, Garrett & Dunner, L.L.P.

[57] ABSTRACT

A super wide-angle variable magnification viewfinder includes an objective lens group of a positive refractive power. The objective lens group further includes a fixed first lens unit of a negative refractive power, a movable second lens unit of a negative refractive power for compensating the change of a view angle, a movable third lens unit of a positive refractive power for changing the magnification of the optical system, and a fixed fourth lens unit of a positive refractive power. Also included in the finder is a prism for erecting an image and an eyepiece lens group of a positive refractive power. The objective lens group forms an actual image of an object, and the actual image can be observed through the eyepiece lens group. The view finder satisfies the condition:

$$1.75 < L_t/f_T < 1.87$$

where $f_T$ is the focal length of the objective lens group at the telephoto position, and $L_t$ is the distance from a first lens surface of the objective lens group to a focus.

11 Claims, 8 Drawing Sheets

SUPER WIDE-ANGLE VARIABLE MAGNIFICATION VIEW FINDER

BACKGROUND OF THE INVENTION

A. Field of the Invention

The present invention relates to a compact super wide-angle variable magnification viewfinder for providing a real image variable finder optical system of a lens shutter camera or a video camera.

B. Description of the Prior Art

Most compact cameras conventionally employ a virtual image finder, such as an Albada finder or an inverse Galilean finder. These finders provide a relatively wide angle view, while at the same time having a compact construction since they do not require a prism for erecting an image. In these finders, however, the lens closest to an object must be large and a marginal zone of the finder's view field blurs. Because of the these drawbacks, real image finders have been employed instead of virtual image finders. Furthermore, a real image optical system is more accurate in developing a picture-taking lens of a compact camera having a wide angle view.

In optical systems using real image finders, an objective lens group and a condenser lens group form an image of an object. The enlarged image of the object is then observed through an eyepiece group. However, the field of view becomes restricted since the marginal zone of view is positioned on the image formed through the objective lens group. Thus in order to form an objective image once in the finder, the construction of the finder becomes more complex and larger in size.

If a real image finder of an optical system is to be compact, then the wide angle view may be achieved if an image formed through the objective lens is small. This is done by decreasing the focal distance of the objective lens at a wide angle position. However, this makes it difficult to compensate for aberrations since the refractive power of the objective lens will increase as the focal distance of the objective lens decreases.

Therefore, it has not been possible to make a compact real image finder which is able to achieve a wide angle view. Real image finders have been used with a panoramic function to make them more compact. Furthermore, other conventional techniques have been proposed to reduce the size of real image finders while having a lens with a wide view angle.

In Japanese Patent Application Unexamined Publication No. Hei 6-102454, a variable magnification finder having a variation ratio of less than 2.0 times is disclosed. The disadvantage of this approach is that the power of a second lens group will be too large and it is difficult to obtain a magnification higher than 2.0 times since a distortion aberration will occur.

U.S. Pat. No. 4,842,395 and U.S. Pat. No. 5,086,353 disclose similar finder constructions. These finders have variation ratios of 2.0 times, and compensate for aberrations by moving a first lens group. One disadvantage with these approaches is that an additional cover glass needs to be inserted when assembling the camera. In addition, general aberration balance is liable to break since the camera includes three lens groups, causing the power of the second lens group to become too strong.

Accordingly, an object of the present invention is to provide a super wide-angle variable magnification viewfinder that can obtain a visual field at a super wide angle position of over 71 degrees, while substantially obviating the problems of the prior art. In addition, it is an object of the invention to provide a viewfinder which has a good overall aberration performance from the wide angle position to a telephoto position in a real image variable finder optical system of either a lens shutter camera or a video camera.

SUMMARY OF THE INVENTION

A super wide-angle variable magnification viewfinder is disclosed. The viewfinder includes an objective lens group which has an overall positive refractive power. The objective lens group further includes a first lens unit which remains fixed in position and which has a negative refractive power with respect to an object. Also included in the objective lens group is a movable second lens unit, which is convex with respect to the object and has negative refractive power, and a movable third lens unit of a positive refractive power. Finally, a fourth lens unit, which remains fixed in position and has a positive refractive power, is included in the objective lens group.

Also included is an eyepiece group which has a positive refractive power. The magnification of the object is changed by moving the third lens unit, and a change in a view angle is compensated for by moving the second lens unit. In addition, the viewfinder satisfies the following condition:

$$1.75 < L_t/f_T < 1.87$$

where $f_T$ represents the focal length of the objective lens group at a telephoto position, and $L_t$ represents the distance from a first lens surface of the objective lens group to a focal point.

Additional aspects of the invention are set forth in part in the description which follows; and will be either obvious from the description, or learned through practice of the invention.

BRIEF DESCRIPTION OF THE DRAWINGS

The accompanying drawings, illustrate embodiments of the invention, and, together with the description, serve to explain the principles of the invention.

DESCRIPTION OF THE PREFERRED EMBODIMENTS

Reference will now be made in detail to preferred embodiments of the present invention, examples of which are illustrated in the accompanying drawings.

Figure 1:
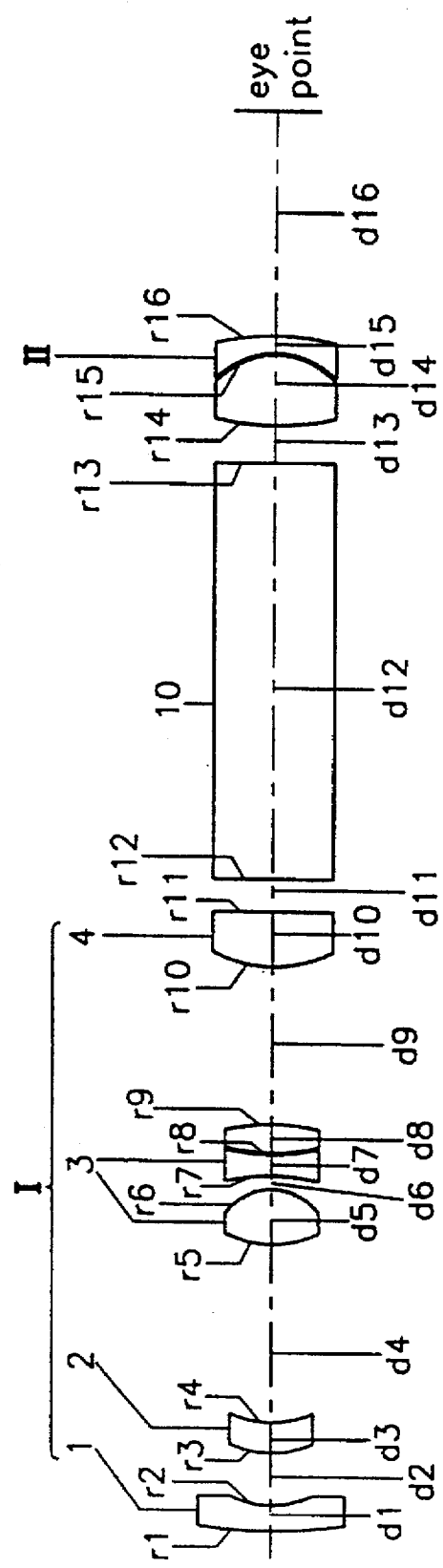
FIG. 1 is a schematic sectional view illustrating lens groups of a super wide-angle variable magnification view finder, in accordance with the first preferred embodiment of the present invention, at a wide angle position.
Figure 2:
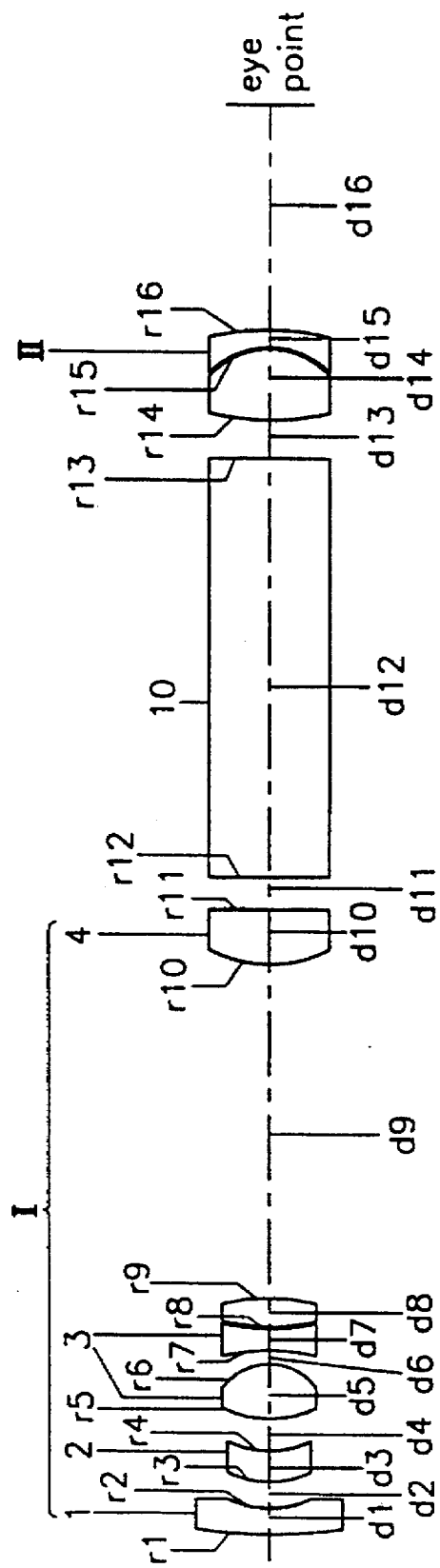
FIG. 2 is a view, similar to FIG. 1, but at a telephoto position.
Figure 5:
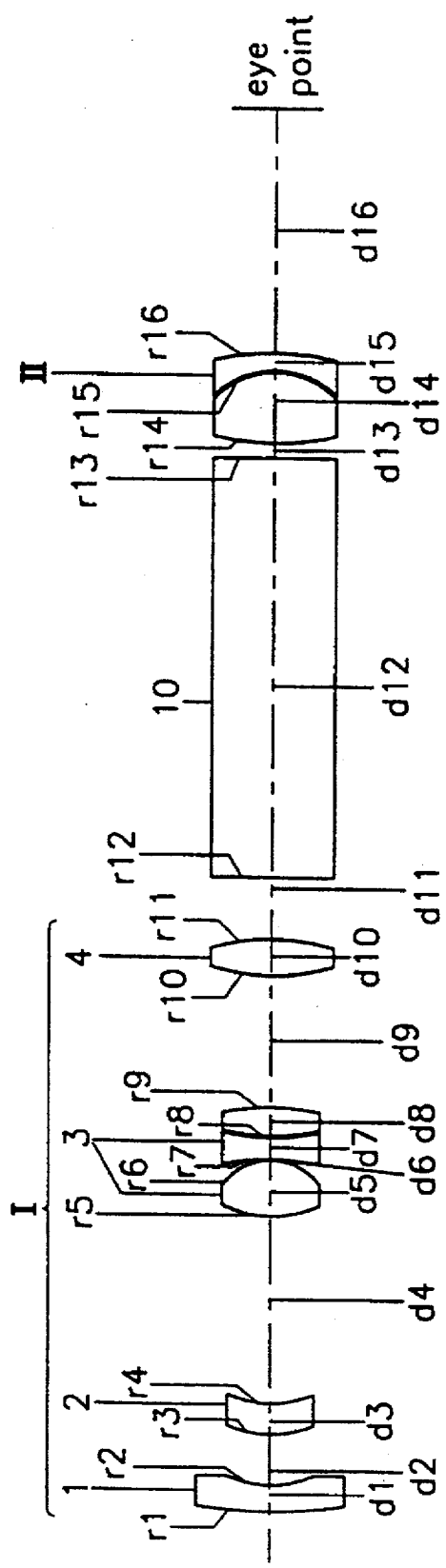
FIG. 5 is a schematic sectional view illustrating lens groups of a super wide-angle variable magnification viewfinder, in accordance with the second preferred embodiment of the present invention, at a wide angle position.
Figure 6:
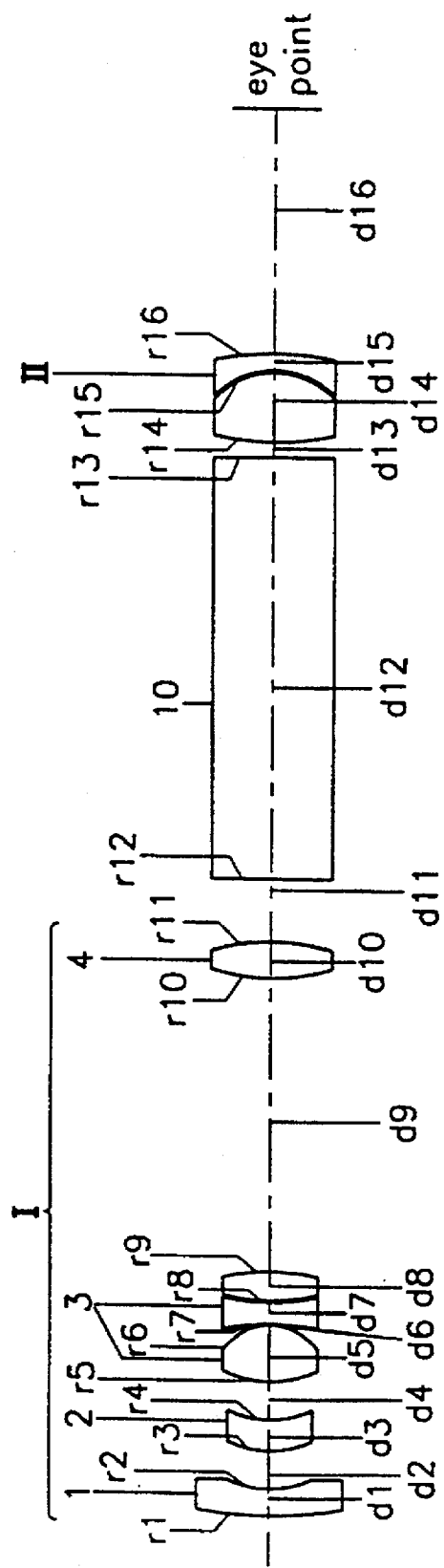
FIG. 6 is a view, similar to FIG. 5, but at a telephoto position.

Referring to either FIG. 1, 2, 5 or 6, the present invention provides a super wide-angle variable magnification viewfinder. Starting from the objective side of the viewfinder (i.e., the left side of the Figures), an objective lens group I forms an actual image of an object. A prism 10 erects the image, and provides the image to an eyepiece lens group II through which the image can be observed.

The objective lens group I, which has a positive refractive power, includes: a fixed convex first lens unit 1 having a negative refractive power; a movable second lens unit 2 having a negative refractive power and which compensates for the change of a view angle; a movable third lens unit 3 having a positive refractive power which changes the magnification of the optical system; and a fixed fourth lens unit 4 having a positive refractive power. The third lens unit 3 further includes at least one aspheric surface and at least two lenses of a positive refractive power. The fourth lens unit 4 further includes a lens which is convex with respect to the object. In addition, at least one aspheric surface is placed between the first lens unit 1 and the fourth lens unit 4. The eyepiece group II includes at least two abutting lenses, each with different refractive powers. The magnification of the object is changed by moving the third lens unit, and a change in a view angle is compensated for by moving the second lens unit.

Image formation is first made near the fourth lens unit 4. The view angle of the viewfinder is controlled by moving the eyepiece lens group II. Also included is a prism 10 which is mounted between the fourth lens unit 4 and an eyepiece lens group II.

The operation of the super wide-angle variable magnification viewfinder, in accordance with a preferred embodiment of the present invention, will now be described. As illustrated in FIG. 1, 2, 5 or 6, the objective lens group I is divided into several units: a variation section, a compensation section, and an image formation section. The refractive power is thereby dispersed to make the aberration change by the magnification variation small. In addition, the dispersion of the refractive power allows good aberration performance over the whole variation region while still maintaining a relatively compact construction.

The negative refractive power of the first lens unit 1 is strong enough to make the viewing angle as large as possible at the wide angle position. This, in turn, reduces a load of the negative refractive power of the second lens unit 2. In addition, all of the aberrations (i.e., spherical aberration, curvature of field, etc.) are reduced by properly distributing the refractive powers of the first lens unit 1 and the second lens unit 2.

In accordance with a preferred embodiment of the present invention, the super wide-angle variable magnification viewfinder fulfills a first condition:

$$1.75 < L_t/f_T < 1.87 \quad (1)$$

where $f_T$ is the focal length of the objective lens group I at the telephoto position, and $L_t$ is the distance from a first lens surface of the objective lens group I to a focal point.

If the ratio $L_t/f_T$ exceeds the upper limit of condition (1), then it is difficult to obtain a compact super wide-angle variable magnification viewfinder. This will be true since either the entire length of the objective lens group I becomes too large, or it is not possible to obtain a required zoom ratio.

If the ratio $L_t/f_T$ falls below the lower limit of condition (1), then it is very difficult to assemble the system since a distance between the second lens unit 2 and the third lens unit 3 becomes very small. In addition, it is not possible to obtain the required performance since aberrations occur (i.e., curvature of field) if the entire length becomes too small.

In accordance with a preferred embodiment of the present invention, the super wide-angle variable magnification viewfinder fulfills a second condition:

$$4.90 < L_t/f_W < 5.6 \quad (2)$$

where fw is the focal length of the objective lens group I at the wide angle position.

If the ratio $L_t/fw$ exceeds the upper limit of condition (2), it will be easy to obtain the compact system since the focal length and the height of an image at the focus surface of the objective lens group I will both be small. This causes the enlarged magnification in the eyepiece group II to become too large. However, it is difficult to assemble the system in this case since dust on the focus surface of the objective lens group I is enlarged.

If the ratio $L_t/fw$ falls below the lower limit of condition (2), aberrations will occur as the entire length becomes smaller. Thus, it is difficult to obtain the compact system since the focal length will be long.

In accordance with a preferred embodiment of the present invention, the super wide-angle variable magnification viewfinder fulfills a third condition:

$$-0.77 < f_T/f_1 < -0.57 \quad (3)$$

where $f_1$ is the focal length of the first lens unit.

If the ratio $f_T/F_1$ exceeds the upper limit of condition (3), then distortion will become large. This occurs either because the refractive power of the first lens unit 1 becomes too strong, or it is not possible to obtain the required zoom ratio because the focal length at the telephoto position is short.

If the ratio $f_T/F_1$ falls below the lower limit of condition (3), it is not possible to obtain the viewing angle required at the wide angle position. This occurs because the refractive power of the first lens unit 1 becomes weak.

In accordance with a preferred embodiment of the present invention, the super wide-angle variable magnification viewfinder fulfills a fourth condition:

$$-0.27 < fw/f_1 < -0.20 \quad (4)$$

If the ratio $fw/f_1$ exceeds the upper limit of condition (4), the entire length becomes smaller. This occurs because the focal length fw becomes short. It will not be possible to obtain the required performance due to the occurrence of aberrations in the eyepiece group II. This occurs because the height of the image of the objective lens group I and the focal length of the eyepiece group II both become small.

If the ratio $fw/f_1$ falls below the lower limit of condition (4), the aberration balance will break. This occurs because the refractive power of the first lens unit 1 becomes too strong.

In accordance with a preferred embodiment of the present invention, the super wide-angle variable magnification viewfinder fulfills a fifth condition which relates to a zoom ratio:

$$2.75 < f_T/fw < 3.05 \quad (5)$$

If the ratio $f_T/fw$ exceeds the upper limit of condition (5), then it is not possible to obtain the required aberration performance. This is true because the zoom angle will increase when the angle becomes the super wide angle at the wide angle position.

If the ratio $f_T/f_W$ falls below the lower limit of condition (5), it is possible to obtain a some good aberration performance. However, it is difficult to obtain a finder having a high zoom ratio because the zoom ratio becomes small.

A coefficient of an aspherical surface of the wide-angle variable magnification finder, satisfying the above-mentioned conditions (1) to (5), is expressed by the following equation:

$$X = \frac{Cy^2}{1+\{1-(K+1)C^2y^2\}^{1/2}} + A_4y^4 + A_6y^6 + A_8y^8 + A_{10}y^{10}$$

where:

X represents an optical axial distance from the lens vertex;

Y represents a vertical distance of the optical axis;

C represents a reciprocal of the radius of curvature;

K represents a conic number; and $A_4$, $A_6$, $A_8$, $A_{10}$ represent aspherical coefficients.

Values which satisfy the above-mentioned conditions are described in the Tables below in which all units of length are denominated in millimeters. In these Tables, the following variables are used:

$r_i$ (i=1–16) represents a radius of curvature of a refractive surface;

$d_i$ (i=1–16) represents a lens thickness or a distance between two lens surfaces;

nd represents a d-line refractive indices of a lens;

ν represents an Abbe number of a lens;

m represents a magnification of an overall optical system; and

ω represents a half viewing angle.

Values for a first preferred embodiment of the present invention are shown in Table 1, where the viewing angle 2ω ranges from 71.2° to 23.9° and the magnification m ranges from −0.30 to −0.87.

TABLE 1

| Surface number | Radius of a curvature ($r_i$) | Thickness ($d_i$) | Refractive power (nd) | Abbe number (ν) |
|---|---|---|---|---|
| 1 | 104.016 | 1.00 | 1.49200 | 57.4 |
| *2 | 12.397 | variable | | |
| *3 | 9.047 | 1.29 | 1.49200 | 57.4 |
| *4 | 5.000 | variable | | |
| *5 | 8.554 | 3.31 | 1.49200 | 57.4 |
| 6 | −6.402 | 0.78 | | |
| 7 | −25.383 | 1.00 | 1.84666 | 23.8 |
| 8 | 25.383 | 1.72 | 1.48749 | 70.4 |
| 9 | −24.496 | variable | | |
| *10 | 10.576 | 3.40 | 1.49200 | 57.4 |
| 11 | ∞ | 2.13 | | |
| 12 | ∞ | 26.40 | 1.51680 | 64.2 |
| 13 | ∞ | 2.24 | | |
| 14 | 30.292 | 4.47 | 1.56883 | 56.0 |
| 15 | −8.184 | 1.00 | 1.72825 | 28.2 |
| 16 | −24.237 | 19.00 | | |

In the first preferred embodiment of the present invention, the above-mentioned distance between lens surfaces and the coefficient of the aspherical surface vary according to a view angle, as shown in Tables 2 and 3 respectively.

TABLE 2

| | 2ω = 71.2° | 2ω = 31.8° | 2ω = 23.9° |
|---|---|---|---|
| d2 | 3.583 | 4.167 | 1.571 |
| d4 | 10.811 | 1.984 | 1.200 |
| d9 | 9.96 | 18.197 | 21.606 |

TABLE 3

| | Second surface | Third surface | Fourth surface |
|---|---|---|---|
| K | 0.3050709E+1 | −0.2010966E+2 | −0.1104189E+2 |
| A4 | −0.1696768E−3 | −0.2033045E−2 | 0.1863622E−2 |
| A6 | −0.2841211E−4 | 0.1555063E−3 | −0.3193484E−3 |
| A8 | 0 | −0.3492197E−4 | −0.7050969E−5 |
| A10 | 0 | 0.1386070E−5 | 0.1681307E−6 |

| | Fifth surface | Tenth surface |
|---|---|---|
| K | −0.1564095E+2 | −0.2165626E+3 |
| A4 | 0.6996547E−3 | 0.1724542E−2 |
| A6 | −0.3104219E−4 | 0.6655328E−4 |
| A8 | −0.2890336E−5 | −0.6791355E−5 |
| A10 | 0.1358639E−6 | 0.1214678E−6 |

Figure 3A:
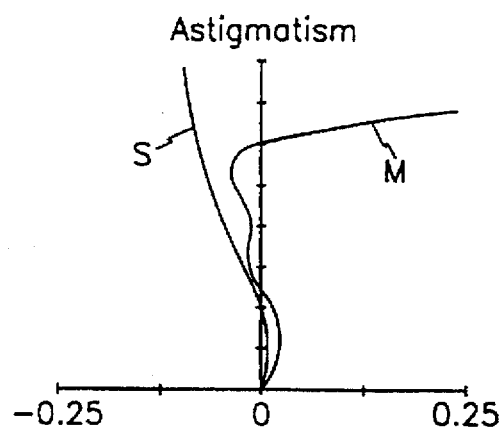
FIGS. 3A to 3C are views illustrating aberrations of a super wide-angle variable magnification finder, in accordance with the first preferred embodiment of the present invention, at a wide angle position.
Figure 3B:
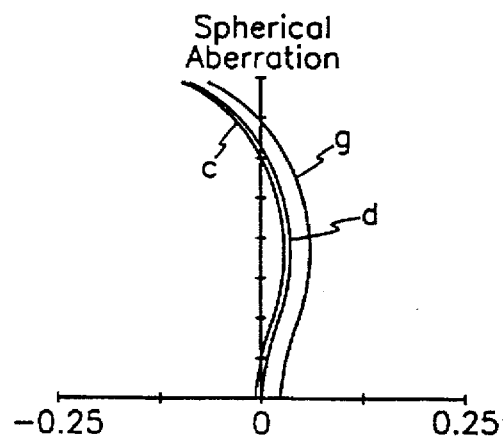
Figure 3C:
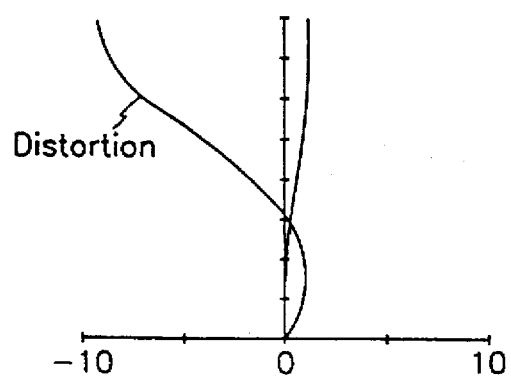
Figure 4A:
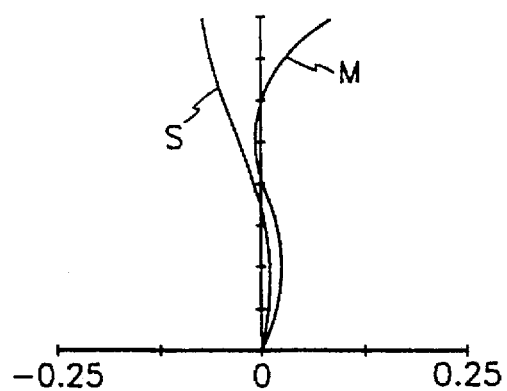
FIGS. 4A to 4C are views, similar to FIGS. 3A to 3C, but at a telephoto position.
Figure 4B:
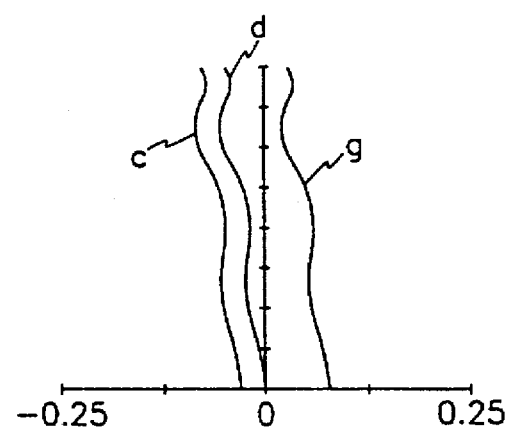
Figure 4C:
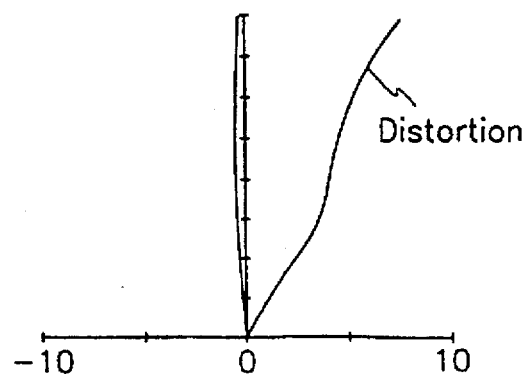

FIGS. 3A to 3C and FIGS. 4A to 4C illustrate the superior aberration characteristics of the first preferred embodiment, at a wide angle and telephoto position, respectively.

Values for a second preferred embodiment of the present invention are shown in Table 4, where the viewing angle 2ω ranges from 71.2° to 23.9° and the magnification m ranges from −0.31 to −0.87.

TABLE 4

| surface number | radius of a curvature ($r_i$) | thickness ($d_i$) | refractive power (nd) | Abbe number (ν) |
|---|---|---|---|---|
| 1 | 141.932 | 1.00 | 1.49200 | 57.4 |
| *2 | 13.731 | variable | | |
| *3 | 8.079 | 1.29 | 1.49200 | 57.4 |
| *4 | 5.018 | variable | | |
| *5 | 8.238 | 3.20 | 1.49200 | 57.4 |
| 6 | −7.066 | 0.10 | | |
| 7 | −25.441 | 1.00 | 1.84666 | 23.8 |
| 8 | 25.441 | 1.65 | 1.48749 | 70.4 |
| 9 | −30.530 | variable | | |
| *10 | 17.570 | 2.20 | 1.49200 | 57.4 |
| 11 | −24.595 | 4.15 | | |
| 12 | ∞ | 30.70 | 1.51680 | 64.2 |
| 13 | ∞ | 0.70 | | |
| 14 | 30.292 | 4.47 | 1.56883 | 56.0 |
| 15 | −8.184 | 1.00 | 1.72825 | 28.2 |
| 16 | −24.237 | 19.00 | | | where * represents the aspherical surface.

In the second preferred embodiment of the present invention, the above-mentioned distance between lenses and the coefficient of the aspherical surface vary according to the view angle as shown in Tables 5 and 6.

TABLE 5

| | 2ω = 71.2° | 2ω = 31.8° | 2ω = 23.9° |
|---|---|---|---|
| d2 | 2.743 | 4.165 | 1.352 |
| d4 | 12.012 | 2.108 | 1.200 |
| d9 | 8.76 | 17.235 | 20.973 |

TABLE 6

|     | Second surface | Third surface | Fourth surface |
|-----|---------------|---------------|----------------|
| K   | 0.4080533E+1  | −0.3388649E+2 | −0.1407004E+2  |
| A4  | −0.6149298E−4 | 0.2999007E−2  | 0.5212587E−2   |
| A6  | −0.2988882E−4 | −0.5078958E−3 | −0.7360252E−3  |
| A8  | 0             | 0.2299126E−4  | 0.3854404E−4   |
| A10 | 0             | −0.5372258E−6 | −0.8044870E−6  |

|     | Fifth surface | Tenth surface |
|-----|---------------|---------------|
| K   | −0.1899500E+2 | −0.1500000E+3 |
| A4  | 0.1974032E−2  | 0.9918810E−3  |
| A6  | −0.1631894E−3 | −0.5604448E−4 |
| A8  | 0.5823079E−5  | 0.1536202E−5  |
| A10 | −0.5372258E−6 | −0.1828773E−7 |

Figure 7A:
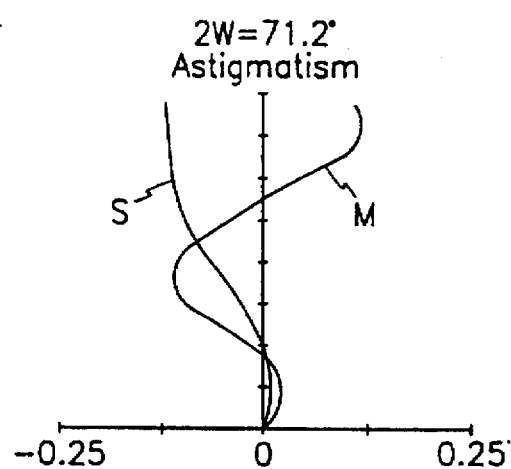
FIGS. 7A to 7C are views illustrating aberrations of a super wide-angle variable magnification finder, in accordance with the second preferred embodiment of the present invention, at a wide angle position.
Figure 7B:
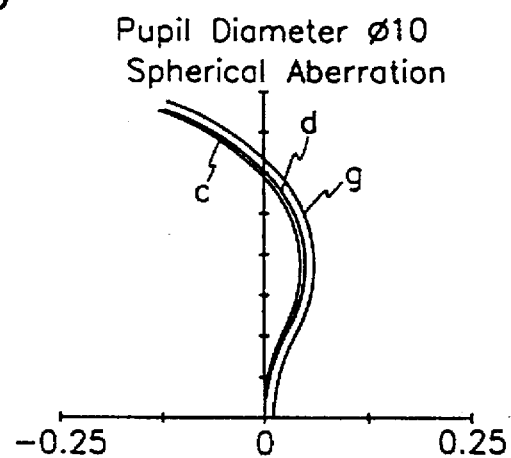
Figure 7C:
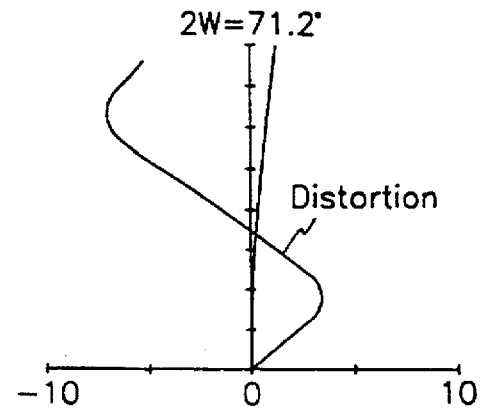
Figure 8A:
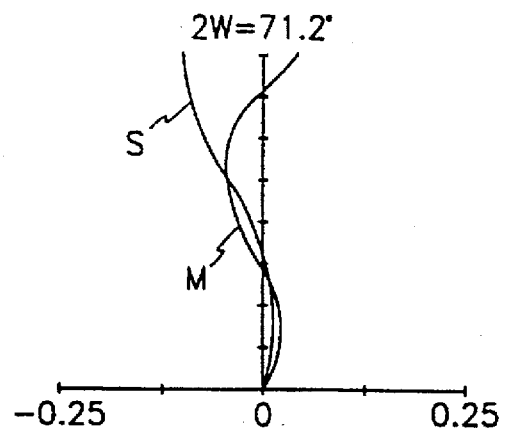
FIGS. 8A to 8C are views, similar to FIGS. 7A to 7C, but at a telephoto position.
Figure 8B:
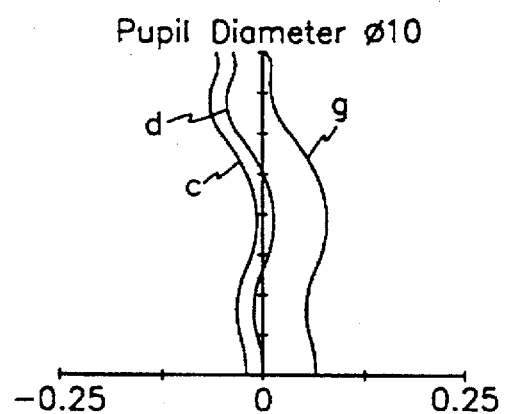
Figure 8C:
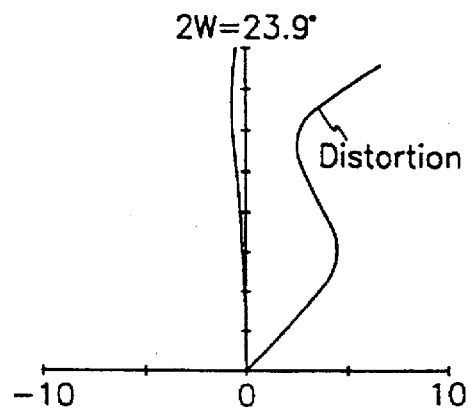

FIGS. 7A to 7C and FIGS. 8A to 8C illustrate the superior aberration characteristics of the second preferred embodiment, at a wide angle and telephoto position, respectively.

Values for the ratios of conditions (1) through (5), in accordance with the first and second preferred embodiments of the present invention, are shown in Table 7.

TABLE 7

| Ratios      | First Embodiment | Second Embodiment |
|-------------|------------------|-------------------|
| $L_t/f_T$   | 1.80             | 1.82              |
| $L_t/fw$    | 5.27             | 5.18              |
| $f_T/f_1$   | −0.66            | −0.71             |
| $fw/f_1$    | −0.24            | −0.23             |
| $f_T/fw$    | 2.85             | 2.93              |

As described above, the effect of the super wide-angle variable magnification viewfinder, in accordance with preferred embodiments of the present invention, is that it is possible to make the viewfinder compact by reducing the entire length of the objective lens group. In addition, the invention can obtain a visual field having a super wide-angle position of over 71 degrees and have good overall aberration performance from the wide angle position to the telephoto position. Furthermore, these results can be obtained when the invention is used in a real image variable finder optical system of either a lens shutter camera or a video camera. Finally, the present invention allows the super wide-angle variable magnification viewfinder to have a high magnification of over 2.8 times.

Upon consideration of the specification and practice of the disclosed invention, other embodiments of the invention will be apparent to those skilled in the art. It is intended that the specification and examples be considered as exemplary only, with the true scope and spirit of the invention being indicated by the following claims.

What is claimed is:

1. A super wide-angle variable magnification viewfinder, comprising:
    an objective lens group which has an overall positive refractive power, the objective lens group comprising:
        a first lens unit which remains fixed in position and which has a negative refractive power with respect to an object;
        a movable second lens unit which is convex with respect to tee object and has a negative refractive power;
        a movable third lens unit of a positive refractive power; and
        a fourth lens unit which remains fixed in position and has a positive refractive power;
    an eyepiece group which has a positive refractive power, wherein the magnification of the object is changed by moving the third lens unit, and a change in a view angle is compensated for by moving the second lens unit; and wherein the following condition is satisfied:

$$1.75 < L_t/f_T < 1.87$$

where $f_T$ represents the focal length of the objective lens group at a telephoto position, and $L_t$ represents the distance from a first lens surface of the objective lens group to a focal point.

2. The viewfinder of claim 1, wherein the following condition is satisfied:

$$4.90 < L_t/fw < 5.6$$

where fw represents the focal length of the objective lens group at the wide angle position.

3. The viewfinder of claim 1, wherein the following condition is satisfied:

$$-0.77 < f_T/f_1 < -0.57$$

where $f_1$ represents the focal length of the first lens unit.

4. The viewfinder of claim 1, wherein the following condition is satisfied:

$$-0.27 < fw/f_1 < -0.20$$

where fw represents the focal length of the objective lens group at the wide angle position and $f_1$ represents the focal length of the first lens unit.

5. The viewfinder of claim 1, wherein the following condition is satisfied:

$$2.75 < f_T/fw < 3.05$$

where fw represents the focal length of the objective lens group at the wide angle position.

6. The viewfinder of claim 1, wherein the third lens unit of the objective lens group comprises at least one aspherical surface and at least two lenses having a positive refractive power.

7. The viewfinder of claim 1, wherein the first lens unit comprises a lens which is convex with respect to the object and one element of the lens unit has a negative refractive power.

8. The viewfinder of claim 1, comprising at least one aspheric surface between the first lens unit and the fourth lens unit.

9. The viewfinder of claim 1, wherein the eyepiece group comprises at least two abutting lenses, each with different refractive powers.

10. The viewfinder of claim 1, comprising a prism mounted between the fourth lens unit of the objective lens group and the eyepiece group, and wherein the view angle is controlled by moving the eyepiece group.

11. The viewfinder of claim 1, wherein image formation is first made near the fourth lens unit.

* * * * *

UNITED STATES PATENT AND TRADEMARK OFFICE
CERTIFICATE OF CORRECTION

PATENT NO. : 5,717,521
DATED : February 10, 1998
INVENTOR(S) : Moon-Hyeon KIM

It is certified that error appears in the above-identified patent and that said Letters Patent is hereby corrected as shown below:

Claim 1, column 7, line 62, "tee" should read --the--.

Signed and Sealed this

Tenth Day of November 1998

Attest:

BRUCE LEHMAN

Attesting Officer    Commissioner of Patents and Trademarks